United States Patent [19]
Luthi

[11] Patent Number: 5,238,564
[45] Date of Patent: Aug. 24, 1993

[54] METHOD AND APPARATUS FOR CONTROL OF FILTRATE VOLUME IN A DISC FILTER

[75] Inventor: Oscar Luthi, Nashua, N.H.

[73] Assignee: Ingersoll-Rand Company, Woodcliff Lake, N.J.

[21] Appl. No.: 923,707

[22] Filed: Jul. 31, 1992

[51] Int. Cl.$^5$ .............................................. B01D 29/11
[52] U.S. Cl. ................................... 210/780; 210/331; 210/346; 210/486
[58] Field of Search ............... 210/331, 324, 325, 486, 210/346, 347, 487, 780; 55/361, 367, 369, 379

[56] References Cited
U.S. PATENT DOCUMENTS
4,686,040  8/1987  Nilsson ............................... 210/331

Primary Examiner—Frank Sever
Attorney, Agent, or Firm—Robert F. Palermo

[57] ABSTRACT

A rotating disc filter has a plurality of discs, each made of a plurality of sectors removably mounted on support structures which are fixed on a rotating hollow shaft into core drainage channels of which, the sectors drain. The drainage and support structure has flow channels designed to rapidly drain filtrate and to permit filtrate split between clear and fiber bearing fractions. Rapid drainage is made possible by a novel method and device for controlling fluid transit volume within the sectors.

14 Claims, 5 Drawing Sheets

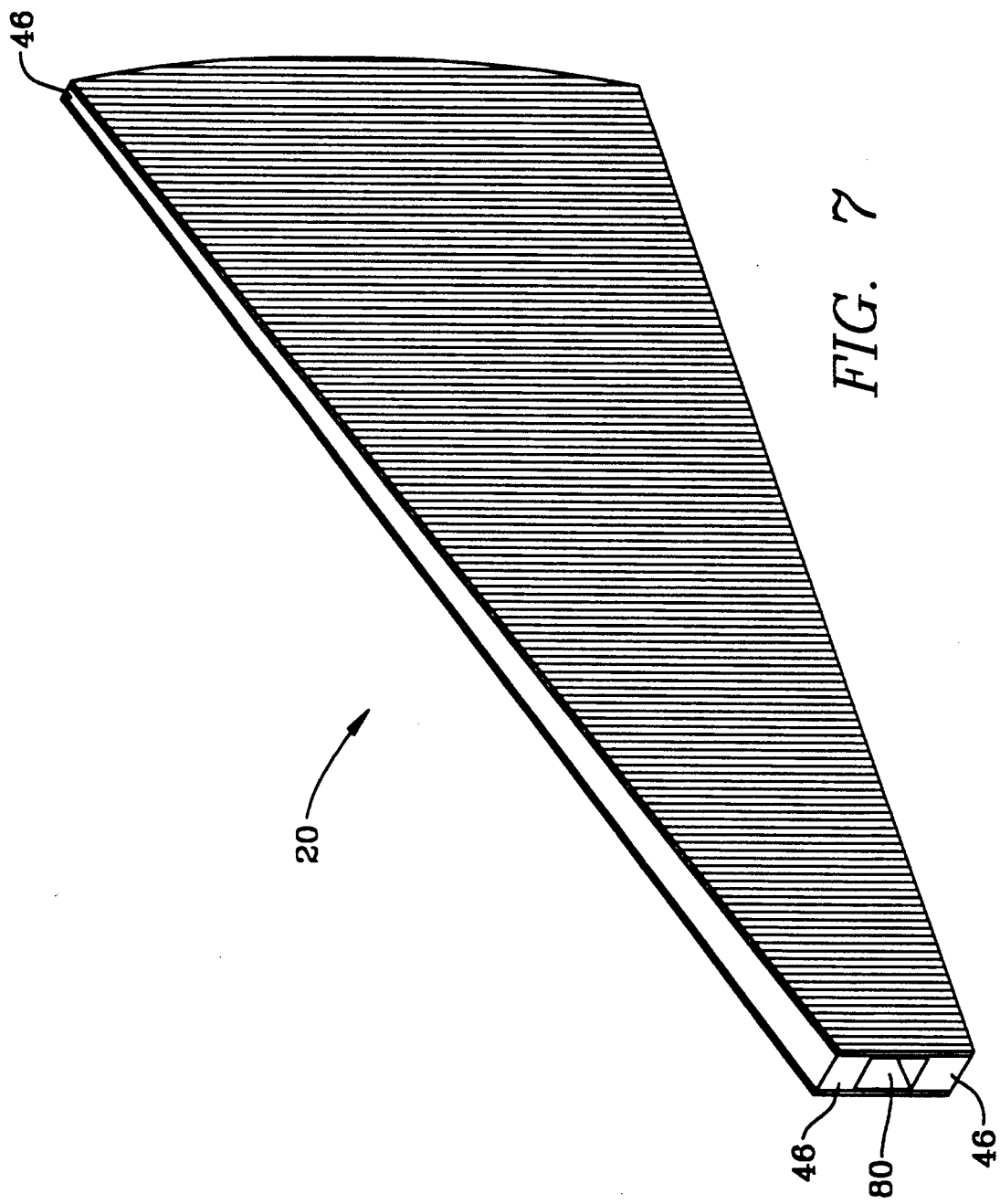

METHOD AND APPARATUS FOR CONTROL OF FILTRATE VOLUME IN A DISC FILTER

BACKGROUND OF THE INVENTION

This invention relates generally to rotating filter discs, and, more particularly, to filter disc sectors which have controlled internal volumes in order to limit the volume of filtrate in transit through the sectors at any time.

Many disc filters are disclosed in the prior art to filter slurries in the paper and pulp industries. In larger sizes, the discs are, typically, made-up of adjacent sectors mounted on a generally hollow rotating shaft so that successive sectors of the disc are rotated into, and out of, the slurry. During the immersion of each sector in the slurry, a pressure differential is applied causing the liquid in the slurry to flow along flow channels on each sector axial surface, into a drainage bore, and thence into a core drainage channel in the hollow shaft, while a filter cake builds up on the filter bag or face wire on the outside surface of each sector. Upon emergence of a sector from the slurry, the filter cake is removed, first by ceasing application of the pressure differential, and then, by application of a knock-off shower designed to peel away the substantially dry filter cake. This cake is then collected while the sector re-enters the slurry to begin another cycle.

Demands for increased filtration capacities have led to increasing filter sizes, with some commercial applications now ranging to 18' or more in diameter. For slow draining low consistency pulps (Approx. 0.5 to 2.0% solids, by weight) a large volume of liquor must be removed to significantly thicken the slurry. This liquor must be reprocessed or otherwise disposed of. Since, as the filter cake develops, it acts as a fine filter medium, it is expected that the first liquor collected will be less clean (or contain more fine fibers) than will that which is separated later in the cake building cycle. Thus, it would be economically beneficial to split the filtrate into fractions corresponding to its fiber content in order to reduce handling and unnecessary reprocessing costs. Ideally, all fiber-bearing filtrate would return to the feed slurry, while all fiber-free filtrate would be disposed of or re-used, as appropriate. In order to make such a split, it is necessary to drain the filtrate very rapidly in order to not mix the early (cloudy) filtrate with the later (clear) filtrate.

Disc filters preferably operate within a carefully defined set of parameters which at times may appear to conflict. That is, for maximum filtration capability, a large surface area is dictated; at the same time, to maximize rapidity of drainage or filtrate discharge from the disc filter, the so-called "transit volume"—i.e. that volume which collects, contains, and subsequently discharges, the filtrate—must be small. The transit volume of the disc filter, is defined as the leaf volume plus the core volume, i.e. the total internal volume of all the sectors of a disc filter plus the volume of the core drainage channel, usually within the hollow rotary shaft.

For effective separation, it is best to maximize the scavenging ratio (SR) which is defined as the filtrate flow rate (gpm) divided by the product of the transit volume (gals. capacity) and the rotary frequency (rpm) of the disc. A scavenging ratio of four or higher is desirable for adequate filtrate split.

From this it is seen that SR is increased by increasing filtrate flow rate (pumping rate) or by decreasing transit volume or disc speed or both. Since decreasing disc speed reduces capacity, transit volume is the preferred control variable, given an established pumping rate or filtrate flow rate.

Thinner discs have been tried for assuring rapid discharge by minimizing transit volume, but they may result in discs, or sectors, which do not have adequate strength to resist the large drag forces and crushing forces experienced by the sector during rotation into and out of the slurry. Drag forces are due to the apparent viscosity of the slurry, while crushing forces are due to the pressure required to drive the filtrate through the filter medium. Thus, the sector thickness must be great enough to provide adequate mechanical strength and durability to withstand the large forces attendant on the large surface area of the sectors. Sectors are commonly fabricated from stainless steel in order to achieve maximum strength and durability while maintaining minimum sector weight and cost. The leaf volume, because of the sector thickness required to withstand forces described above, often is still too large to achieve the desired scavenging ratio of four or more.

Attempts to strengthen the sectors by using heavy gauge materials increase the weight to the extent that lifting equipment is required for handling the sectors during face wire or screen replacement, and reinforcement of the filter core (or hollow shaft) is required. The leaf volume usually remains too large to achieve the desired high scavenging ratio. To compensate for the leaf volume, attempts have been made to seal the hollow volume beneath the leaf (or sector) deck, i e., the imperforate sector surface having flow channels open to the filter surface for draining filtrate to the core drainage channel When these seals fail and leak, the hollow volumes fill with liquor, and drastically increase sector weight and distortion loads on the filter core, thereby increasing wear and tear on the filter From this it is clear that the parameters which determine optimal filtering performance are not always compatible with economy, strength, reliability, and ease of maintenance.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a disc filter for removing filtrate from a slurry, made up of a plurality of radially symmetrical sectors, wherein each sector has first and second surfaces having formed thereon a plurality of fluid collection channels, symmetrical about a radial centerline of the sector for collecting filtrate. At least one hollow drainage bore is formed in each sector and is in flow communication with the surface collection channels. Means are provided for limiting an internal, filtrate—accessible volume of the sector for controlling a filtrate scavenging ratio for the sector. Structural support means provide orientation and attachment of the sector when the sector is mounted on a rotatable hollow drainage core of said disc filter.

The foregoing and other aspects will become apparent from the following detailed description of the invention when considered in conjunction with the accompanying drawings.

BRIEF DESCRIPTION OF THE DRAWINGS

FIG. 7 illustrates another embodiment of the invention in which the sector has an "open volume" configuration.

DETAILED DESCRIPTION

Figure 1:
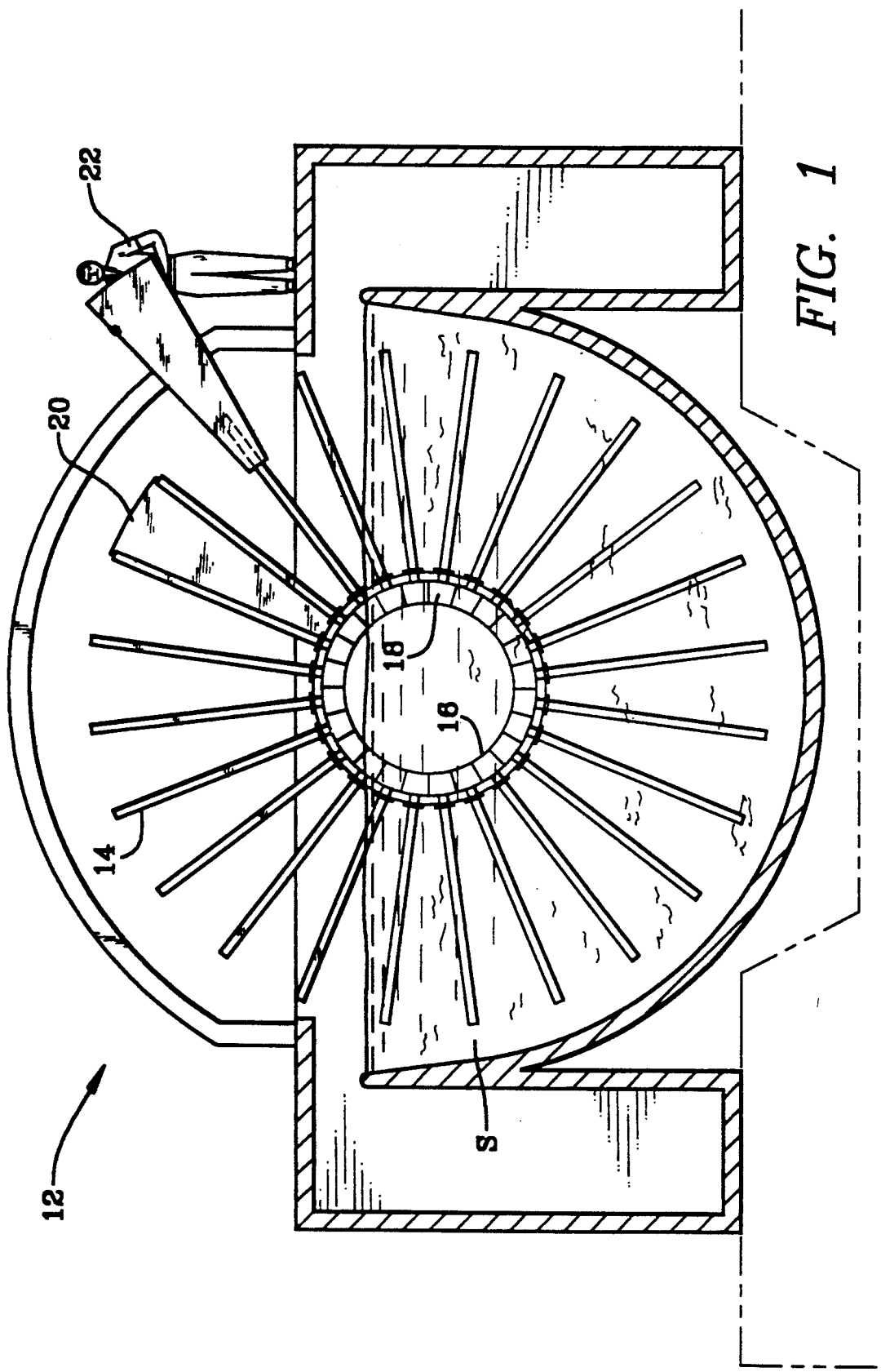
FIG. 1 is a cross-sectional end view of a disc filter employed in a filtration apparatus and utilizing modular sectors.

FIG. 1 shows a cross-sectional end view of a typical disc filter installation operating in a vat 12 containing a slurry S. A plurality of hollow filter sectors 20 are affixed (by conventional means) to a rotatable hollow shaft 16 which contains a plurality of core drainage channels 18, at least one such channel for each sector (or leaf) 20. Each sector 20 is adapted to be mounted upon hollow shaft 16, such that the core drainage channels 18 are in flow communication with at least one drainage bore (not shown) in each sector 20.

The truncated wedge shape of the filter sector 20 allows it to be installed between the opposing channels of support towers 14 and to be clamped in place by a circumferential retaining band 60 of sequentially attached segments, by individual clamp members 80 fastened to support towers 14, by clamp band segments integral to each sector, or by other commonly known methods. The person 22 is shown to give a scale reference for the size of the filter sectors 20.

The general operation of the disc (there being a plurality of these discs spaced along the axis of rotation of hollow shaft 16) calls for each disc, comprised of a plurality of sectors 20 mounted on hollow shaft 16 and held in place by support towers 14, to rotate, in either direction through a slurry S contained within vat 12. As each sector is submerged into the slurry at zero degrees of rotation, slurry liquid penetrates through the sector surfaces and into the sector drainage bores within each sector 20, due to an applied pressure differential, and is extracted through the hollow filtrate accessible volume of disc sector 20 and core drainage channels 18. This causes a filter cake of the fibrous solid portion of the slurry, which is retained on the surface of sector 20. This build-up continuously from submersion to emergence of each sector from the slurry.

Since the filter cake on the surfaces of sectors 20 itself acts as a filtering medium, the filtrate removed during later stages of operation is clearer than that which is removed during earlier stages and is normally drained separately from the early, or cloudy filtrate, by conventional valving (not shown). When a particular sector 20 emerges from the slurry, differential pressure is still being applied to remove filtrate accumulated within the hollow sectors 20 and core drainage channels 18. The effects of gravity will also aid the drainage of each sector 20 toward core drainage channel 18. When application of differential pressure is terminated, the filter cake on each of the surfaces of sectors 20 is removed by a conventional so-called "knock-off shower" (not shown), which is common in the art.

Figure 2A:
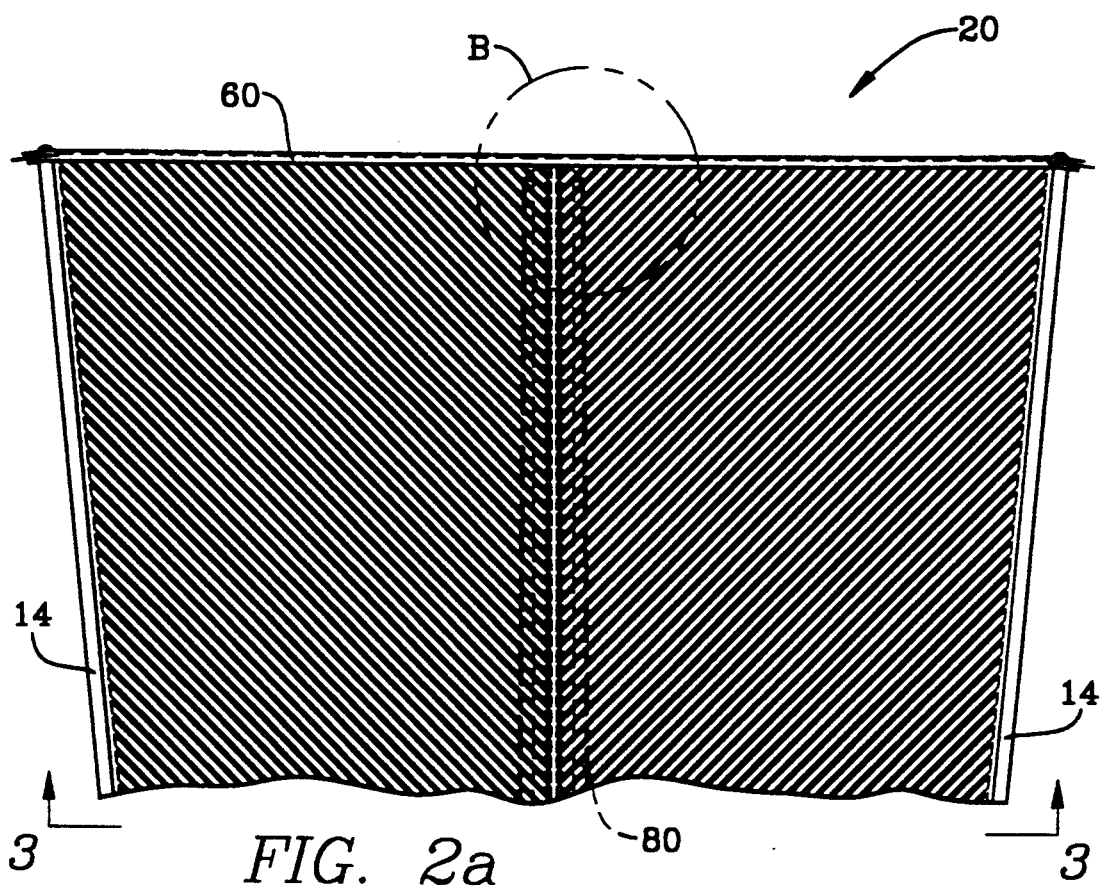
FIGS. 2a and 2b are a fragmentary schematic plan view and a local blown-up view, respectively, of a portion of a sector illustrating the surface collection channels which lead filtrate into a drainage bore within the sector.
Figure 2B:
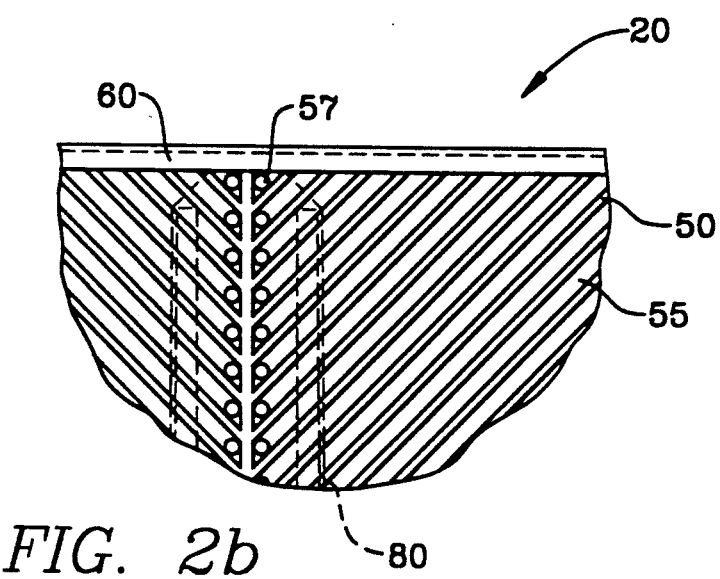

FIGS. 2a and 2b illustrate the face of a sector 20 and show further detail of the surface flow channels 55, support towers 14, retaining band 60, surface drain holes 57, surface ridges 50, and the sector drainage bore 80 (shown in dashed lines).

The sector 20 is mounted between support towers 14 and is retained in place by a circumferential retainer band 60 which is installed in segments as the sectors are installed. On the surface, ridges 50 define a number of symmetric flow channels 55 which allow filtrate to drain through drain holes 57 into drainage bore 80. Note that the drainage bore is shown at the center of sector 20 as a matter of convenience only and is not limited to that location. The bore may be coextensive with the sector face and may also be divided so that it comprises two or more separate bores within each sector. Its configuration and location is determined, at least in part, by considerations of strength and fluid flow, which are functions of sector material selection and filter design capacity. In general, it is desirable to make drainage channels increase in cross-section from a minimum size near the periphery to a maximum size near the drainage core in order to handle the cumulative volume of filtrate which flows in each location. This may be accomplished also by adding more channels as the core drainage channel is approached.

Figure 3:
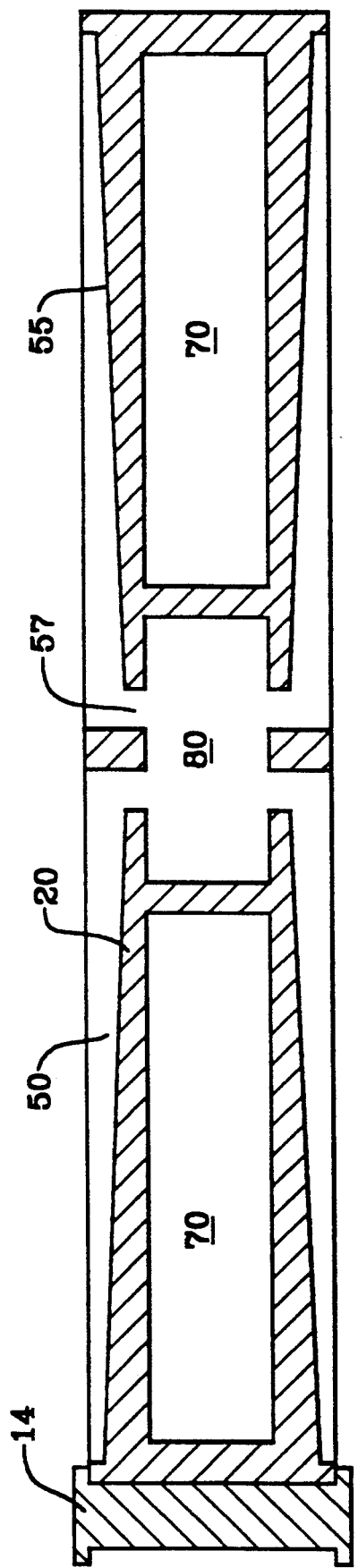
FIG. 3 is a cross-sectional view of a sector and its drainage bore taken along line 3—3 of FIG. 2a and illustrating the sealed hollow of the prior art beneath the sector deck.

A sectional view from line 3—3 of FIG. 2a is seen in FIG. 3 and illustrates the sealed hollow volume 70 used in the prior art to limit transit volume in disc filters. Here, drainage bore 80 is shown in more detail as is support tower 14, sector surface ridges 50, surface drainage channels 55, and drain holes 57. The divergence (or increase in cross-section) of flow channels 55, as described above, is clearly shown. As illustrated here, the body of sector 20 is a single piece which may be molded from an appropriate polymeric material or may be fabricated from parts made from corrosion resistant metal or other materials. Hollow volumes 70 are sealed fluid tight to eliminate them from the transit volume of the sector. As long as that seal lasts, the sector performs acceptably. When the seal begins to leak and the sector fills with liquor, the filtrate split becomes less selective, and the added weight causes high stresses on support towers 14, hollow shaft 16, and sector 20. Moreover, when leaks become large enough, hollow volumes 70 become part of the transit volume.

Figure 4:
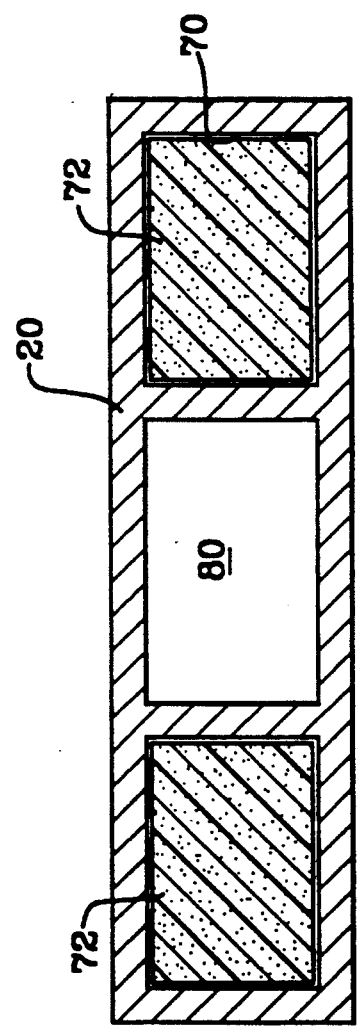
FIG. 4 is a sectional view, as in FIG. 3, illustrating one embodiment of the transit volume control provided in the invention.
Figure 5:
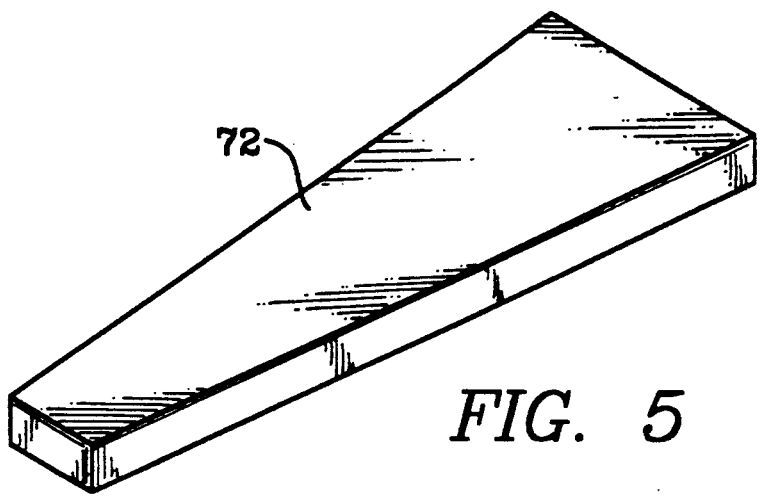
FIG. 5 is a sectional view along line 5—5 of FIG. 4 showing further detail of the embodiment of the invention shown in FIG. 4.

FIGS. 4 and 5 illustrate one embodiment of the invention which may be applied to new sectors or as a retrofit in existing filter sectors if the hollow volumes have an amenable configuration. Sector 20 is shown with drainage bore 80 and hollow volumes 70. However, hollow volumes 70 are shown with displacement wedges 72 in place, a situation which precludes liquor from the slurry from entering the hollow volume 70 and thereby limits transit volume and increases scavenging ratio. This offers an advantage over the sealed hollow volumes of the prior art in that no seal is needed since there is only a negligible volume available for liquor when displacement wedges 72 are installed, and leakage is of no consequence. Displacement wedges 72 are made from a foamed plastic, such as polypropylene or from other lightweight fluid impervious material, are shaped to be insertable into the volumes 70, and are fixed therein by any suitable means (not shown).

Figure 6A:
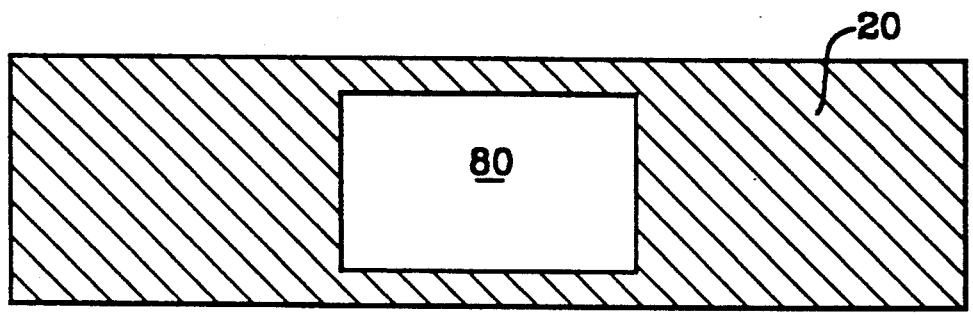
FIGS. 6a and 6b illustrate, in cross-section, two alternative embodiments of the transit volume control device of the present invention.
Figure 6B:
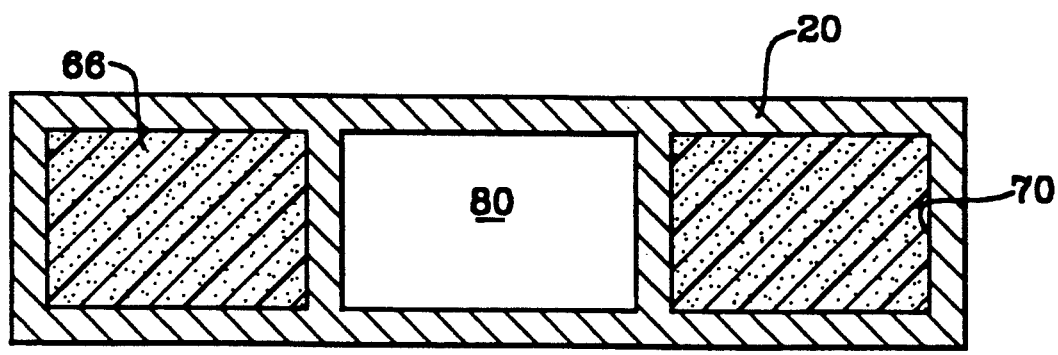

Another embodiment of the invention is shown in FIGS. 6a and 6b, in which sector 20 is molded without hollow volumes other than drainage bore 80 from a solid homopolymer, i.e., a single polymer, in FIG. 6a; and in which it is molded about permanent cores 66 in FIG. 6b. The option in FIG. 6b is preferable: because the cores 66 may be made from low density and low strength relatively inexpensive material since their only function is to occupy volume. Once a minimum level of strength and chemical resistance in the cores 66 is satisfied, further increases in properties are not needed. The solid-molded sector of FIG. 6a, is stronger but more costly and heavier than the option of FIG. 6b. The embodiment of FIG. 6b can also be attained by molding a sector 20 with drainage bore 80 and hollow volumes 70, as shown, for example, in FIG. 3, and by foaming-in-place an appropriate polymer to fill hollow volumes 70. Foaming-in-place provides the advantages of complete filling of, conformance to the shape of, and ease of installation in the hollow volumes 70 of sector 20.

FIG. 7 presents an open option in which the interior of sector 20 is completely open to the slurry in the vat 12 except for the drainage bore 80. The sector faces are separated and supported by the drainage bore 80 and by under-deck bracing (not shown) as required. Thus, when the sector enters the slurry, open volumes 46 instantly fill with slurry, and they instantly drain-back into the filter vat 12 (FIG. 1) as they emerge. This is the preferred embodiment; because it is lightweight and, assuming that the strength is equal, will be less costly to make, and will have a longer service life.

Since the internal hollow volumes 70 of a sector 20 should not carry filtrate to core channel 18 if transit volume is to be minimized, several options have been presented for effectively eliminating these volumes from each sector 20.

Sectors 20 may be constituted of stainless steel, a polymeric composite material, or other appropriate materials or combinations thereof. Likewise, the support towers 14, core channels 18, and hollow shaft 16 may also be made of the same materials.

While the invention has bee illustrated with sectors 20 having centrally located drainage bores 80, it is clearly within the scope of the invention to locate the drainage bore off-center, that is asymmetrically within a sector, or even to locate it outside the sector 20 in support tower 14. The location of the drainage bore 80 may require some revision of the layout of the surface drainage channels 55 and ridges 50.

What is claimed is:

1. A disc filter for removing filtrate from a slurry, made up of a plurality of discs, each disc having a plurality of radially symmetrical sectors mounted on a hollow shaft, wherein each sector comprises:
   first and second surfaces having formed thereon a plurality of surface fluid drainage channels symmetrical about a radial centerline of each sector for collecting filtrate;
   at least one drainage bore in each said sector in flow communication with both the surface fluid drainage channels of each sector and a core drainage channel within said hollow shaft by means of a conduit fixed to said hollow shaft and insertable into said drainage bore; and
   means for maximizing a scavenging ratio for said sector including means for limiting an internal filtrate-accessible hollow volume of the sector.

2. The disc filter of claim 1, wherein said at least one drainage bore is located along said radial centerline of said sector.

3. The disc filter of claim 1, wherein said at least one drainage bore is located within each of a plurality of support tower means for mounting said sector on said hollow shaft and for conducting filtrate from surface fluid drainage channels to said core drainage channel within said hollow shaft.

4. The disc filter of claim 3, wherein said each of a plurality of support tower means for mounting said sector on said hollow shaft is inserted in at least one drainage bore in each said sector in flow communication with both the surface fluid drainage channels of each sector and a core drainage channel within said hollow shaft.

5. The disc filter of claim 1, wherein the means for limiting the hollow volume of the sector comprises:
   displacement wedges, formed from a fluid resistant material, which fill said hollow volume when inserted into said volume.

6. The disc filter of claim 1, wherein each sector further comprises:
   internal hollow volumes that are open to the slurry but are closed to said surface fluid drainage channels and said drainage bore.

7. The disc filter of claim 6, wherein the means for limiting the hollow volume of the sector comprises:
   polymeric filler foamed-in-place within said internal hollow volumes.

8. The disc filter of claim 1, wherein the means for limiting the hollow volume of the sector comprises:
   polymeric cores over which said sector is molded.

9. The disc filter of claim 1, wherein the means for limiting the hollow volume of the sector comprises:
   polymeric filler foamed-in-place within said hollow volume.

10. The disc filter of claim 1, wherein each said sector has two drainage bore means, one at each lateral edge, for conducting filtrate from symmetrical surface drainage grooves to said core drainage channel.

11. In a disc filter for removing filtrate from a slurry, the disc filter including a plurality of radially symmetrical sectors each having two axially opposite filtering faces mounted on support towers and draining into a hollow shaft core drain, the improvement comprising:
   means for maximizing a scavenging ratio for said sector including means within each sector for minimizing transit volume for the sector.

12. The disc filter of claim 11, wherein the means for minimizing transit volume comprises:
   means for filling a hollow volume within the sector to exclude filtrate.

13. The disc filter of claim 11, wherein the means for minimizing transit volume comprises:
   internal hollow volumes that are open to the slurry but are closed to said surface fluid drainage channels and said drainage bore.

14. A method for control of filtrate transit volume in a disc filter sector, comprising:
   providing low-volume diverging filtrate collection channels beneath a filter face screen; and
   maximizing a scavenging ratio of said sector by providing means for limiting access of filtrate to a hollow volume within said disc filter sector.

* * * * *